United States Patent
Pritscher et al.

(10) Patent No.: US 11,990,299 B2
(45) Date of Patent: May 21, 2024

(54) SWITCH-OFF DEVICE, HIGH-VOLTAGE ONBOARD ELECTRICAL SYSTEM, AND MOTOR VEHICLE

(71) Applicant: Bayerische Motoren Werke Aktiengesellschaft, Munich (DE)

(72) Inventors: Florian Pritscher, Landshut (DE); Christian Schardax, Garsten Nord (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 176 days.

(21) Appl. No.: 17/789,687

(22) PCT Filed: Jan. 26, 2021

(86) PCT No.: PCT/EP2021/051674
§ 371 (c)(1),
(2) Date: Jun. 28, 2022

(87) PCT Pub. No.: WO2021/170326
PCT Pub. Date: Sep. 2, 2021

(65) Prior Publication Data
US 2023/0049101 A1 Feb. 16, 2023

(30) Foreign Application Priority Data
Feb. 25, 2020 (DE) ...................... 10 2020 104 935.8

(51) Int. Cl.
*H01H 39/00* (2006.01)
*B60L 3/04* (2006.01)
(Continued)

(52) U.S. Cl.
CPC ............ *H01H 39/006* (2013.01); *B60L 3/04* (2013.01); *B60R 16/033* (2013.01); *H01H 85/38* (2013.01); *H01H 2039/008* (2013.01)

(58) Field of Classification Search
CPC .. H01H 39/006; H01H 39/002; H01H 39/004; H01H 2039/008; H01H 9/465;
(Continued)

(56) References Cited

U.S. PATENT DOCUMENTS 5,783,987 A * 7/1998 Kern ...................... H01H 39/00
337/403
5,793,275 A * 8/1998 Iversen ................ H01H 85/055
337/296
(Continued)

FOREIGN PATENT DOCUMENTS

DE   10 2017 207 736 B3   8/2018
DE   10 2017 207 739 B3   8/2018
(Continued)

OTHER PUBLICATIONS

International Search Report (PCT/ISA/210) issued in PCT Application No. PCT/EP2021/051674 dated May 7, 2021 with English translation (six (6) pages).
(Continued)

*Primary Examiner* — William A Bolton
(74) *Attorney, Agent, or Firm* — Crowell & Moring LLP

(57) ABSTRACT

A switch-off device includes a current conductor for forming a load current path, a pyrotechnically activatable separating unit for interrupting the load current path in the event of a fault, including a separating element for detaching the current conductor and a pyrotechnic element for accelerating the separating element in the direction of the current conductor, and an arc extinguishing unit for extinguishing an arc, including a melting conductor which is not normally incorporated into the load current path and an extinguishing device for extinguishing the melting conductor.

10 Claims, 2 Drawing Sheets

(51) Int. Cl.
*B60R 16/033* (2006.01)
*H01H 85/38* (2006.01)

(58) Field of Classification Search
CPC .. H01H 9/106; H01H 85/0241; B60R 16/033; B60L 3/04
USPC ............... 200/52 R, 61.08; 337/403; 218/95
See application file for complete search history.

(56) References Cited

U.S. PATENT DOCUMENTS

| | | | | |
|---|---|---|---|---|
| 7,511,600 | B2* | 3/2009 | Von Behr | H01H 39/006 200/61.08 |
| 9,324,522 | B2* | 4/2016 | Nakamura | H01H 39/006 |
| 9,704,681 | B2* | 7/2017 | Fukuyama | H01H 39/006 |
| 9,905,383 | B2* | 2/2018 | Hori | B60L 3/0007 |
| 10,229,801 | B2* | 3/2019 | Sakai | H01H 39/006 |
| 10,418,212 | B2* | 9/2019 | Warenits | H01H 9/32 |
| 2013/0175144 | A1* | 7/2013 | Sprenger | H01H 39/006 200/61.08 |
| 2014/0061161 | A1 | 3/2014 | Nakamura et al. | |
| 2019/0108957 | A1* | 4/2019 | Volkmann | H01H 39/006 |
| 2019/0244778 | A1* | 8/2019 | Dariavach | H01H 39/006 |
| 2020/0035437 | A1 | 1/2020 | Gaudinat et al. | |
| 2020/0286703 | A1 | 9/2020 | Tazarine et al. | |

FOREIGN PATENT DOCUMENTS

| | | |
|---|---|---|
| DE | 11 2018 000 939 T5 | 11/2019 |
| WO | WO 2019/081128 A1 | 5/2019 |
| WO | WO 2020/260382 A1 | 12/2020 |

OTHER PUBLICATIONS

German-language Written Opinion (PCT/ISA/237) issued in PCT Application No. PCT/EP2021/051674 dated May 7, 2021 (six (6) pages).

German-language Search Report issued in German Application No. 10 2020 104 935.8 dated Oct. 6, 2020 with partial English translation (10 pages).

* cited by examiner

SWITCH-OFF DEVICE, HIGH-VOLTAGE ONBOARD ELECTRICAL SYSTEM, AND MOTOR VEHICLE

BACKGROUND AND SUMMARY OF THE INVENTION

The invention relates to a switch-off device for a high-voltage onboard system of a motor vehicle, having a current conductor for the constitution of a load current path between components of the high-voltage onboard system, and a pyrotechnically activatable separating unit for interrupting the load current path in the event of a fault, having a separating element and a pyrotechnic element, wherein the pyrotechnic element is designed, in the event of a fault, to accelerate the separating element in the direction of the current conductor, and wherein the separating element is designed to separate the current conductor, for the interruption of the load current path. The invention further relates to a high-voltage onboard system and a motor vehicle.

In the present case, interest is focused on high-voltage onboard systems of motor vehicles, for example of electrically-propelled motor vehicles. High-voltage onboard systems of this type comprise a plurality of components which can be constituted, for example, by a traction battery and by at least one high-voltage load, particularly an electric drive motor. The components are electrically connected for the purposes of load current transmission via current conductors, for example conductor rails. In the event of a fault, for example in the event of an overcurrent or fault current flowing via the current conductor, the components must be reliably separated from one another.

To this end, the provision of separating units is known from the prior art, which can interrupt the load current path between the components. The separating units can, for example, be pyrotechnically activated. To this end, the separating units comprise a pyrotechnic unit and a separating element. The pyrotechnic unit is triggered, and thus activated, in the event of the overcurrent, and accelerates the separating element in the direction of the current conductor, thereby separating the current conductor and thus interrupting the load current path. By the separation of the current conductor, the current conductor is divided into two current conductor sections, wherein an unwanted arc can arise between the current conductor sections. In the worst case, this unwanted arc can lead to a fire in the motor vehicle.

The object of the present invention is the provision of a simple solution, whereby a load current path between components of a high-voltage onboard system can be interrupted in a safe and reliable manner.

This object is fulfilled according to the switch-off device, the high-voltage onboard system, and the motor vehicle of the claimed invention.

A switch-off device according to an embodiment of the invention for a high-voltage onboard system of a motor vehicle comprises a current conductor for the constitution of a load current path between components of the high-voltage on-board system, and a pyrotechnically activatable separating unit for interrupting the load current path in the event of a fault. The separating unit comprises a separating element and a pyrotechnic element, wherein the pyrotechnic element is designed, in the event of a fault, to accelerate the separating element in the direction of the current conductor, and wherein the separating element is designed to separate the current conductor, for the interruption of the load current path. The switch-off device moreover comprises an arc quenching unit for quenching an arc which is generated upon the interruption of the load current path. The arc quenching unit comprises a melting conductor, which under normal circumstances is not incorporated in the load current path, and a quenching device for quenching the melting conductor. The separating element is designed, upon the separation of the current conductor, to bend a current conductor piece for the transfer of an arc generated on the melting conductor in the direction of the melting conductor, and thereby to incorporate the melting conductor in the load current path in the event of a fault which generates the arc, wherein the bent current conductor piece and the melting conductor are arranged in an at least temporarily contact-free manner relative to each other during the transfer of the arc.

The invention further relates to a high-voltage onboard system for a motor vehicle having at least two components, and having at least one switch-off device according to an embodiment of the invention, which is designed for the electrical connection of the components under normal circumstances, and for the galvanic separation thereof in the event of a fault. The components can be, for example, a traction accumulator which is constituted in the form of a high-voltage energy store, and an electric drive motor.

The switch-off device comprises the current conductor, which is particularly constituted in the form of a conductor rail. The current conductor electrically connects the at least two components. Under normal circumstances, i.e. in the absence of any overcurrent flowing via the current conductor and/or in the absence of an accident of the motor vehicle, the current conductor can conduct a load current in the form of an operating current. The switch-off device moreover comprises the separating unit which is designed, in the event of a fault, that is to say in the event of an overcurrent flowing via the current conductor and/or in the event of an accident, to mechanically interrupt the current conductor, and thus galvanically separate the components from one another. The separating unit is pyrotechnically activatable, and comprises the separating element and the pyrotechnic element. The separating element can be, for example, a separating piston. The separating piston can comprise, for example, a beveled, guillotine-type separating surface, which can separate the current conductor. The pyrotechnic element can be, for example, a detonator. The pyrotechnic element can be connected to a control device of the motor vehicle, for example to a battery management system, which is designed to activate the pyrotechnic element. The control device incorporates, for example, a current monitoring function. The control device can also comprise a crash interface which is connected, for example, to an airbag control device, for the detection of an accident of the motor vehicle.

As soon as the fault is detected by the control device, an activation signal is delivered to the pyrotechnic element. The pyrotechnic element is triggered as a result, and accelerates the separating element in the direction of the current conductor. The separating element separates the current conductor, and subdivides the latter as a result into at least two current conductor sections. The current conductor undergoes strain in the event of separation, such that the separating element buckles or bends the current conductor piece of the first current conductor section away from the second current conductor section. The bent current conductor piece thus constitutes an operating lever of a switch, which is opened by the separating element, and thus interrupts the electrical connection between the two current conductor sections, and thus between the two components.

In order then to prevent the generation of an unwanted arc, i.e. a fault arc, between the two current conductor sections upon the separation of the current conductor, the arc quenching unit is provided. The latter comprises the melting conductor, which is designed for current limitation, wherein it melts in response to an overcurrent flowing therein. The fusible melting conductor is quenched by the quenching device, for example quenching sand. To this end, for example, the melting conductor is embedded in, or enclosed by, the quenching device. The melting conductor is thus, under normal circumstances, not incorporated in the load current path. For example, a first end or first terminal of the melting conductor can be connected to the second current conductor section, whereas a second end or second terminal of the melting conductor is unconnected. In the event of the flow of a load current via the current conductor, in the form of an overcurrent, the melting conductor is then incorporated in the load current path, wherein the current conductor piece of the first current conductor section transfers the arc, not to the second current conductor section, but to the melting conductor, via which the overcurrent temporarily flows as a result.

To this end, the current conductor piece is bent in the direction of the second terminal of the melting conductor but, at least temporarily, does not engage with the latter. At least temporarily, the melting conductor and the bent current conductor piece are thus arranged spaced apart from one another or in a contact-free manner relative to one another. The melting conductor and the bent current conductor piece, at least temporarily, are thus galvanically separated, wherein the arc can bridge or span a gap between the melting conductor and the bent current conductor piece, and thus incorporates the melting conductor in the load current path. The melting conductor melts, and is quenched by the quenching device. The melting conductor is preferably positioned such that the bent current conductor piece is arranged with a permanent clearance from the melting conductor, such that the arc can be transferred in a contact-free manner from the bent current conductor piece to the melting conductor.

As the melting conductor and the strained conductor rails assume no permanent mutual contact and, under normal circumstances, the melting conductor is not incorporated in the load current path, an interruption of the load current path can also be executed in the event of faults in which insufficient energy is delivered for the melting of the melting conductor. Cases of this type can include, for example, vehicle accidents in which a load-free disconnection of the load current path is executed.

The melting conductor is particularly positioned in this case such that a clearance between the bent current conductor piece and the melting conductor is smaller than a clearance between the bent current conductor piece and the remainder of the current conductor. The current conductor piece, in the bent state, is thus positioned closer to the second terminal of the melting conductor than to the second current conductor section. It can thus be ensured that any arc generated is reliably transferred to the melting conductor, and is thus kept away from the remainder of the current conductor, and therefore from the components of the high-voltage onboard system.

In one embodiment of the invention, the separating element is configured in the form of a separating piston, and the separating unit comprises a guide cylinder, in which the separating piston is arranged and in the event of acceleration is guidable in the direction of the current conductor. In an unactivated state, the pyrotechnic element maintains the separating piston in a starting position in the guide cylinder, with a clearance from the current conductor. Upon the activation of the pyrotechnic element, the separating piston is no longer held in position, but moves within the guide cylinder in the direction of the current conductor to a terminal position. The current conductor is separated accordingly. A piston seal, for example, can be arranged between the separating piston and the guide cylinder.

In a further development of the invention, the separating unit comprises a brake block, which is designed to arrest the separating element further to the separation of the current conductor, and thus to dictate a clearance between the bent current conductor piece and the melting conductor. For example, the guide cylinder, together with the separating piston, can be arranged on one side of the current conductor, and the brake block can be arranged on another side of the current conductor, opposite the guide cylinder and the separating piston. The brake block is positioned such that it arrests the separating piston, which bends the current conductor piece, wherein the bent current conductor piece, in the terminal position of the separating piston, is positioned closer to the melting conductor than to the remainder of the current conductor.

It can also be provided that the braking piston is sprung such that, further to the arresting of the separating piston, a temporary contact can be constituted between the bent current conductor piece and the melting conductor, in the interests of improved arc transfer. The brake block is thus secured by way of a spring which, upon the arresting of the separating piston, is tensioned, thus permitting a temporary contact between the melting conductor and the current conductor piece. After a short time, the spring tension is relieved again, and the brake block returns to a position in which the current conductor piece assumes a clearance from the melting conductor. This embodiment provides an advantage in that, by way of temporary contact, the melting conductor can be activated, even in the absence of an arc, or an arc of sufficient strength, which can be transferred over a given clearance to the melting conductor.

In a further development of the invention, the current conductor incorporates a predetermined break point for the separating element. The predetermined break point can be, for example, a taper in the current conductor. In the region of the predetermined break point, the current conductor thus assumes a reduced conductor cross section. In the event of a fault, the current conductor can thus be interrupted more easily by the separating element.

The invention further relates to a motor vehicle having a high-voltage onboard system according to an embodiment of the invention. The motor vehicle is particularly constituted in the form of an electrically-propelled motor vehicle.

The embodiments, and advantages thereof, envisaged with respect to the switch-off device according to an embodiment of the invention apply correspondingly to the high-voltage onboard system according to an embodiment of the invention and to the motor vehicle according to an embodiment of the invention.

Further features of the invention proceed from the claims, the figures and the description of the figures. The features and combinations of features indicated in the above description, and the features and combinations of features indicated in the description of the figures hereinafter and/or represented on their own in the figures, are not only applicable in the respective combination indicated, but also in other combinations or in isolation.

The invention is described in greater detail hereinafter with reference to a preferred exemplary embodiment, and with reference to the drawings.

DETAILED DESCRIPTION OF THE DRAWINGS

In the figures, identical or functionally equivalent elements are identified by the same reference numbers.

Figure 1:
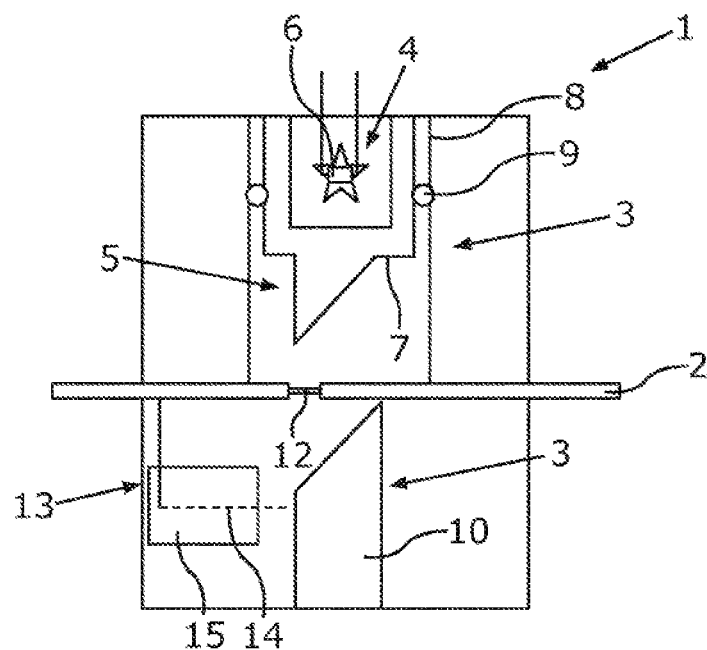
FIG. 1 shows a schematic representation of a first embodiment of a switch-off device for a high-voltage onboard system, under normal circumstances.
Figure 2:
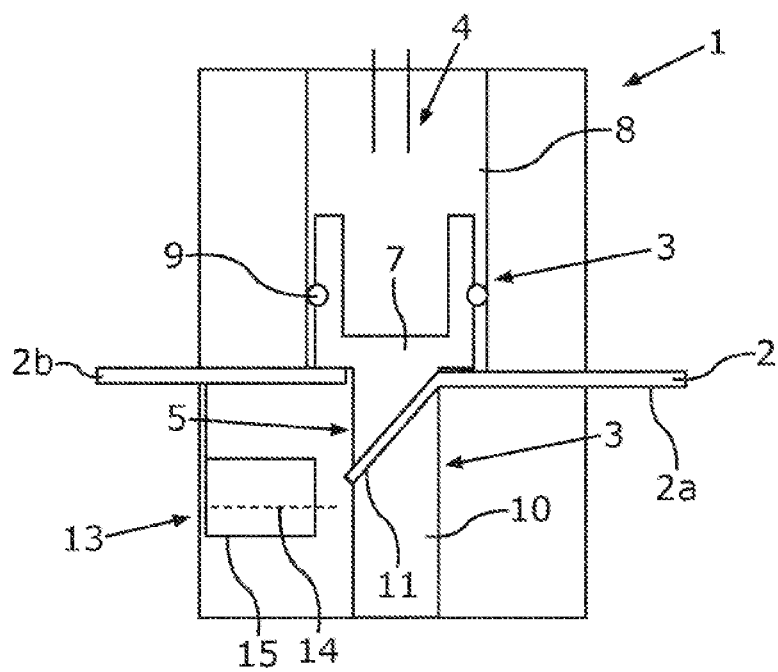
FIG. 2 shows the switch-off device according to FIG. 1, in the event of a fault.

FIG. 1 and FIG. 2 show a first embodiment of a switch-off device 1 for a high-voltage onboard system of a motor vehicle under normal circumstances (FIG. 1) and in the event of a fault (FIG. 2). By way of the switch-off device 1, components of the high-voltage onboard system, which are not represented here, are electrically connected in a separable manner. The components can be, for example, a traction battery and an electric drive unit of the motor vehicle. The switch-off device 1 comprises a current conductor 2 in the form of a conductor rail which, under normal circumstances, can conduct a load current, in the form of an operating current, between the components, and thus constitutes a load current path. Normal circumstances are particularly characterized in that the load current is not an overcurrent, and thus undershoots a predefined overcurrent threshold value, and in that no accident of the motor vehicle is present, further to which disconnection of the components of the high-voltage onboard system is required. In the event of a fault, i.e. if an overcurrent flows via the current conductor 2, or if the motor vehicle sustains an accident or a crash, the load current path should be interrupted.

To this end, the switch-off device 1 comprises a separating unit 3, which comprises a pyrotechnic element 4 and a separating element 5. In this case, the pyrotechnic element 4 is a detonator 6, which can be triggered, for example, by a battery management system of the high-voltage onboard system. In this case, the separating element 5 is a separating piston 7, which is arranged in a guide cylinder 8. A piston seal 9 is arranged between the separating piston 7 and the guide cylinder 8. In FIG. 1, the separating piston 7 is represented in a starting position in the guide cylinder 8, in which the separating piston 7 is held in position by the non-triggered or deactivated detonator 6. In FIG. 2, the separating piston 7 is represented in a terminal position, into which the separating piston 7 has been accelerated by the triggered or activated detonator 6. The separating unit 3 further comprises a brake block 10, which arrests the accelerated separating piston 7, as soon as the latter reaches the terminal position. In its transition from the starting position to the terminal position, the separating piston 7 separates the current conductor 2, and thus subdivides the latter into a first current conductor section 2a and a second current conductor section 2b. A current conductor piece 11 of the first current conductor section 2a is thus bent in the direction of the brake block 10. By the separation of the current conductor 2, the load current path is interrupted. For example, the current conductor 2 can also incorporate a predetermined break point 12, which facilitates the separation of the current conductor 2 by the separating piston 7.

The switch-off device 1 further comprises an arc quenching unit 13, which is designed to capture and quench an arc generated by high switch-off loads. To this end, the arc quenching unit 13 comprises a melting conductor 14, which is embedded in a quenching device 15 of the arc quenching unit 13. The melting conductor 14 can be, for example, a perforated electrically-conductive plate, which melts for the dissipation of energy associated with an overcurrent. The quenching device 15 quenches the fusible melting conductor 14. Under normal circumstances, i.e. for such time as the separating piston 7 is located in the starting position, the melting conductor 14 is not incorporated in the load current path. In this case, the melting conductor 14 is connected on one side to the second current conductor section 2b, whereas the other side faces the brake block 10. In the terminal position of the separating piston 7, and thus in the terminal position of the current conductor piece 11, the melting conductor 14 can be incorporated in the load current path by way of an arc thus generated. To this end, the separating piston 7 moves the current conductor piece 11 in proximity to the melting conductor 14, wherein the current conductor piece 11 does not engage with the melting conductor 14. Accordingly, the melting conductor 14 and the current conductor piece 11 are not in contact.

The separating piston 7 and the brake block 10 are positioned relative to the melting conductor 14, such that a clearance between the bent current conductor piece 11 and the melting conductor 14 is smaller than a clearance between the current conductor piece 11 and the second current conductor section 2b. It can thus be ensured that any arc generated is transferred from the current conductor piece 11 to the melting conductor 14, but not to the second current conductor section 2b. The switch-off device 1 provides an advantage in that, by way of the clearance between the melting conductor 14 and the bent current conductor piece 11, interruption is possible, even at load currents which do not deliver sufficient energy for the melting of the melting conductor 14. In this case, interruption is already achieved by way of the clearance thus set. This solution thus provides a high separation capability, which can also be employed for load-free disconnections, for example in the event of vehicle accidents.

Figure 3:
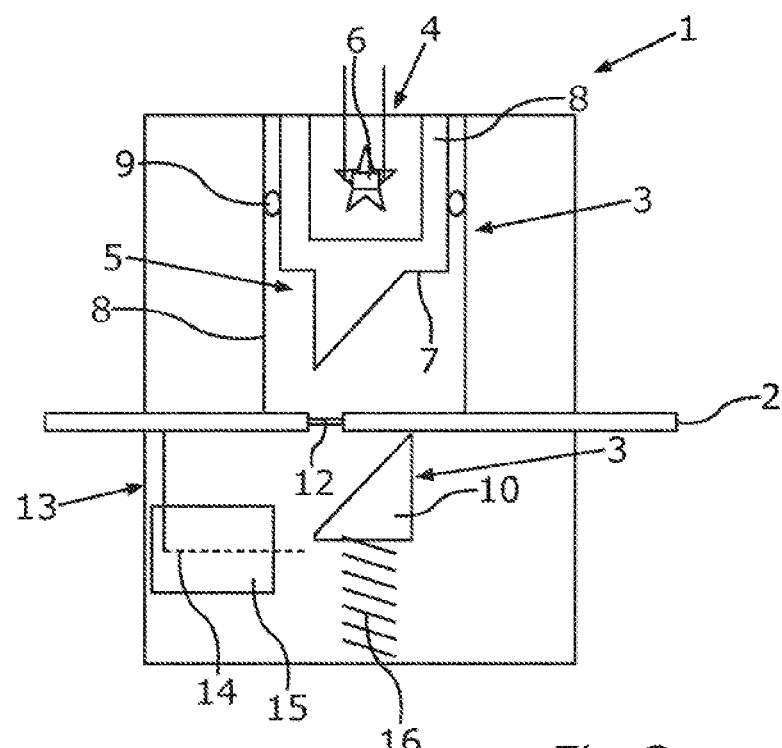
FIG. 3 shows a schematic representation of a second embodiment of a switch-off device for a high-voltage onboard system, under normal circumstances.
Figure 4:
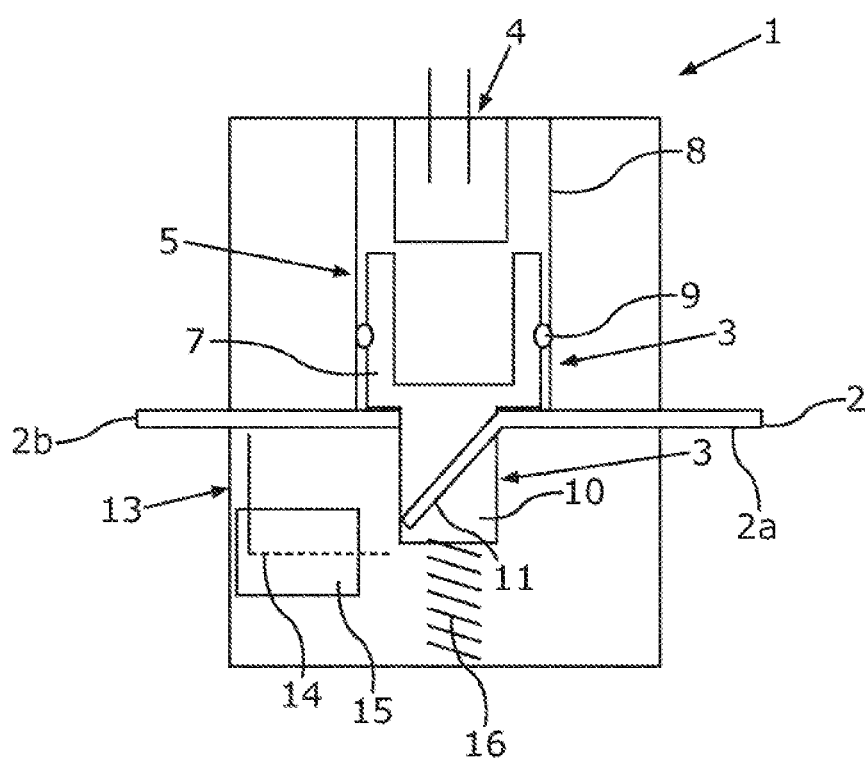
FIG. 4 shows the switch-off device according to FIG. 3, in the event of a fault.

FIG. 3 and FIG. 4 represent a second embodiment of the switch-off device 1, under normal circumstances (FIG. 3) and in the event of a fault (FIG. 4). This second embodiment of the switch-off device 1 differs from the first embodiment of the switch-off device 1, in that the brake block 10 is secured by way of a spring 16. Upon the arresting of the separating piston 7, the brake block 10 is moved downwards by the spring 16, such that a temporary electrical contact can be established between the bent current conductor piece 11 and the melting conductor 14. A secure transfer of the arc to the melting conductor 14 can thus be executed. After a short time, a defined clearance between the melting conductor 14 and the bent current conductor piece 11 is restored, and the components are galvanically separated.

What is claimed is:

1. A switch-off device for a high-voltage onboard system of a motor vehicle, the switch-off device comprising:
   a current conductor for providing a load current path between components of the high-voltage onboard system,
   a pyrotechnically activatable separating unit for interrupting the load current path in an event of a fault, the pyrotechnically activatable separating unit having a separating element and a pyrotechnic element, wherein the pyrotechnic element is configured, in the event of the fault, to accelerate the separating element in a direction of the current conductor, and wherein the separating element is configured to separate the current conductor, for interruption of the load current path, and an arc quenching unit for quenching an arc which is generated upon interruption of the load current path, the arc quenching unit having a melting conductor which, under normal circumstances, is not incorporated in the load current path, and having a quenching device for quenching the melting conductor, wherein the separating element is configured, upon separation of the current conductor, to bend a current conductor piece for transfer of an arc generated on the melting conductor in a direction of the melting conductor, and thereby to incorporate the melting conductor in the load current path in the event of the fault which generates the arc, and wherein the bent current conductor piece and the melting conductor are arranged in an at least temporarily contact-free manner relative to each other during the transfer of the arc.

2. The switch-off device according to claim 1, wherein:
the melting conductor is positioned such that a clearance between the bent current conductor piece and the melting conductor is smaller than a clearance between the bent current conductor piece and a remainder of the current conductor.

3. The switch-off device according to claim 1, wherein:
the melting conductor is positioned such that the bent current conductor piece is arranged with a permanent clearance from the melting conductor, such that the arc is transferrable in a contact-free manner from the bent current conductor piece to the melting conductor.

4. The switch-off device according to claim 1, wherein:
the separating element is constituted as a separating piston, and
the separating unit comprises a guide cylinder in which the separating piston is arranged and in the event of acceleration is guidable in the direction of the current conductor.

5. The switch-off device according to claim 1, wherein:
the separating unit comprises a brake block which is configured to arrest the separating element further to the separation of the current conductor, and thus to define a clearance between the bent current conductor piece and the melting conductor.

6. The switch-off device according to claim 5, wherein:
the braking piston is sprung such that, further to bending of the current conductor piece, a temporary contact can be established between the bent current conductor piece and the melting conductor, for improved arc transfer.

7. The switch-off device according to claim 1, wherein:
the quenching device is constituted as a quenching sand.

8. The switch-off device according to claim 1, wherein:
the current conductor incorporates a predetermined break point for the separating element.

9. A high-voltage onboard system for a motor vehicle, the high-voltage onboard system comprising:
at least two components, and
at least one switch-off device for the electrical connection of the components according to claim 1.

10. A motor vehicle comprising the high-voltage onboard system according to claim 9.

\* \* \* \* \*